(12) United States Patent
Siracusa

(10) Patent No.: US 6,233,738 B1
(45) Date of Patent: *May 22, 2001

(54) INSECT PROTECTIVE HEAD SCREEN ATTACHABLE TO SEVERAL DIFFERENT TYPES OF HATS

(76) Inventor: Peter Siracusa, 108 Teatown Rd., Croton-on-Hudson, NY (US) 10520

( * ) Notice: Subject to any disclaimer, the term of this patent is extended or adjusted under 35 U.S.C. 154(b) by 0 days.

This patent is subject to a terminal disclaimer.

(21) Appl. No.: 09/428,311

(22) Filed: Oct. 25, 1999

Related U.S. Application Data

(63) Continuation-in-part of application No. 09/234,533, filed on Jan. 21, 1999, now Pat. No. 6,049,904.

(51) Int. Cl.$^7$ ........................................................ A42B 1/04

(52) U.S. Cl. ............................ 2/4; 2/145.1; 2/202; 2/207; 2/209.13

(58) Field of Search ................................. 2/4, 195.1, 202, 2/207, 209.13, 9, 181, 181.2, 181.4, 206, 424; D2/866

(56) References Cited

U.S. PATENT DOCUMENTS

| 281,502 | * | 7/1883 | Harvey | 2/206 |
| D. 346,893 | * | 5/1994 | St. Germain | D2/866 |
| 499,965 | * | 6/1893 | Bushnell | 2/206 |
| 1,004,507 | * | 9/1911 | Walz | 2/206 |
| 5,153,943 | * | 10/1992 | Clement | 2/199 |
| 6,049,904 | * | 4/2000 | Siracusa | 2/4 |

* cited by examiner

Primary Examiner—Bibhu Mohanty
(74) Attorney, Agent, or Firm—McGlew and Tuttle, P.C.

(57) ABSTRACT

A flexible fiberglass mesh head screen with a cylindrical shape and sewn at the top and back with the bottom open to be placed over the wearer's head to protect the head and neck from insects. It is designed to be worn over a baseball style cap, construction hard hat, horseback riding helmet or bicycle helmet. It attaches to the button on top of the baseball hat by an elastic strip sewn to the inside top of the head screen, or to hard hats and helmets by two part hook and eye fasteners with the parts connected to the hat/helmet and screen by adhesive or glue. This keeps the head screen firmly on the wearer's head. A material such as fabric or cloth, stronger than the screen material, is connected to the bottom of the screen to hold a drawstring and form a screen collar tightenable around the neck of the user.

20 Claims, 4 Drawing Sheets

INSECT PROTECTIVE HEAD SCREEN ATTACHABLE TO SEVERAL DIFFERENT TYPES OF HATS

RELATED APPLICATIONS

This application is a continuation-in-part of U.S. patent application Ser. No. 09/234,533 now U.S. Pat. No. 6,049,904 filed Jan. 21, 1999, the entire contents of which are hereby incorporated by reference.

FIELD OF THE INVENTION

The present invention relates to a protective head covering which can easily be attached to and removed from a hat, such as any baseball style cap or hat, construction hard hat, horseback riding helmet, or bicycle helmet. The head covering has a material attached to the bottom and a drawstring inside the material. The drawstring and material attach around a collar of the user to prevent insects from getting inside the head covering. When it is attached it remains firmly on the wearer's head regardless of how active the person may be.

BACKGROUND OF THE INVENTION

Baseball style hats are very popular and the hat of choice of most individuals who venture outdoors in the warmer months. Those who spend time in wooded areas, fields, gardens or around lakes and streams have experienced annoying flying insects and the discomfort they bring. Construction type hard hats are also very common, often required, and are worn outdoors where there is a danger from flying insects. Horseback riding helmets and bicycle riding helmets are sometimes necessary to be worn in areas where there are flying insects. Chemical repellents have an odor and are limited in their effectiveness. Also, some users may be allergic to them. Some insect protective head gear can be cumbersome, loose fitting and uncomfortable to wear or require a special head piece to accompany it as well as a separate carrying case.

U.S. Pat. No. 2,472,033 to E. W. Wetzel is for a full brim sportsman's hat in which the screen is a permanent part of the hat and is rolled up into the brim when not in use.

U.S. Pat. No. 4,214,318 to M. D. Gomez describes a portable roll up bug netting comprised of a plastic material which has a band on the upper edge. The netting is attached by securing a band around the hat crown.

U.S. Pat. No. 5,713,076 to M. Davis describes a head piece having a crown and a brim with the outer edge extending part of the way around the crown and a transparent eyepiece attached to the outer edge of the brim.

U.S. Pat. No. 5,367,706 to Davidson describes a cylindrical fabric mesh head net with integral hoops designed to keep the fabric away from the wearer's face.

None of the above patent disclose a head screen that can easily be attached to and removed from the top of a hat, especially a construction type hard hat, horseback riding helmet or bicycle helmet.

An insect protective head screen, if it is to be acceptable to the wearer, must not only be effective in preventing insects from contacting the wearer's head and neck, but it must be comfortable and remain firmly on the wearer's head and convenient to apply, remove and transport.

SUMMARY AND OBJECTS OF THE INVENTION

The primary object of the present invention is to provide a high degree of protection against insects by keeping the head screen secure to the wearer's head by means of its attachment to the top of a hat or helmet of the wearer's choice.

The present invention attains this object with a head screen constructed of mesh fiberglass screening such as that found in windows of most homes. It is cylindrical in shape and sewn across the top and back with the bottom open. When placed on the wearer's head it extends from the top of the head to the top of the shoulders. There is a strip of material on the bottom of the head screen which encloses a draw string. There is an elastic strip sewn into the inside top seam which allows it to be attached to the button on top of most baseball style caps or hats. For hard hats or helmets there is a Velcro type hook and loop fastener which is attached by adhesives to the hat and head screen. Another possibility for the fastening of the head screen is a clip or clamp which clamps to the hat, preferably at a substantially top center portion of the hat and/or clamps/clips to a button on the hat. This keeps the head screen firmly on the hat which is firmly on the wearer's head. It can be easily unattached. The fiberglass screening is durable and rigid enough to keep its intended shape and not cling to the wearer's face, yet it is flexible and can be compacted to a small size for easy transporting. The color is black to minimize the suns glare to the wearer. One part of the hook and loop fastener which is attached to the head screen can also define the button hole.

It is an important object of the invention that the means for fastening the head screen to a hat is repetitively attachable and detachable to the hat without substantially damaging either said fastening means or the hat, and that the attaching and detaching is easily accomplished by the user. this object is attained by the elastic button hole, and the hook/loop fastener. With regard to the fastening means being a clamp/clip, spring biased jaws with butterfly type handles is preferably used. The jaws clamp onto the hat, preferably the button, and the handles are inserted into the button hole. Other connection combinations of a clamp are also possible.

The above-mentioned features of the present invention and the features explained below may be used not only in the described combinations, but the features can also be used individually and/or in other combinations within the scope of the present invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS In the drawings.

DESCRIPTION OF THE PREFERRED EMBODIMENT

Figure 1:
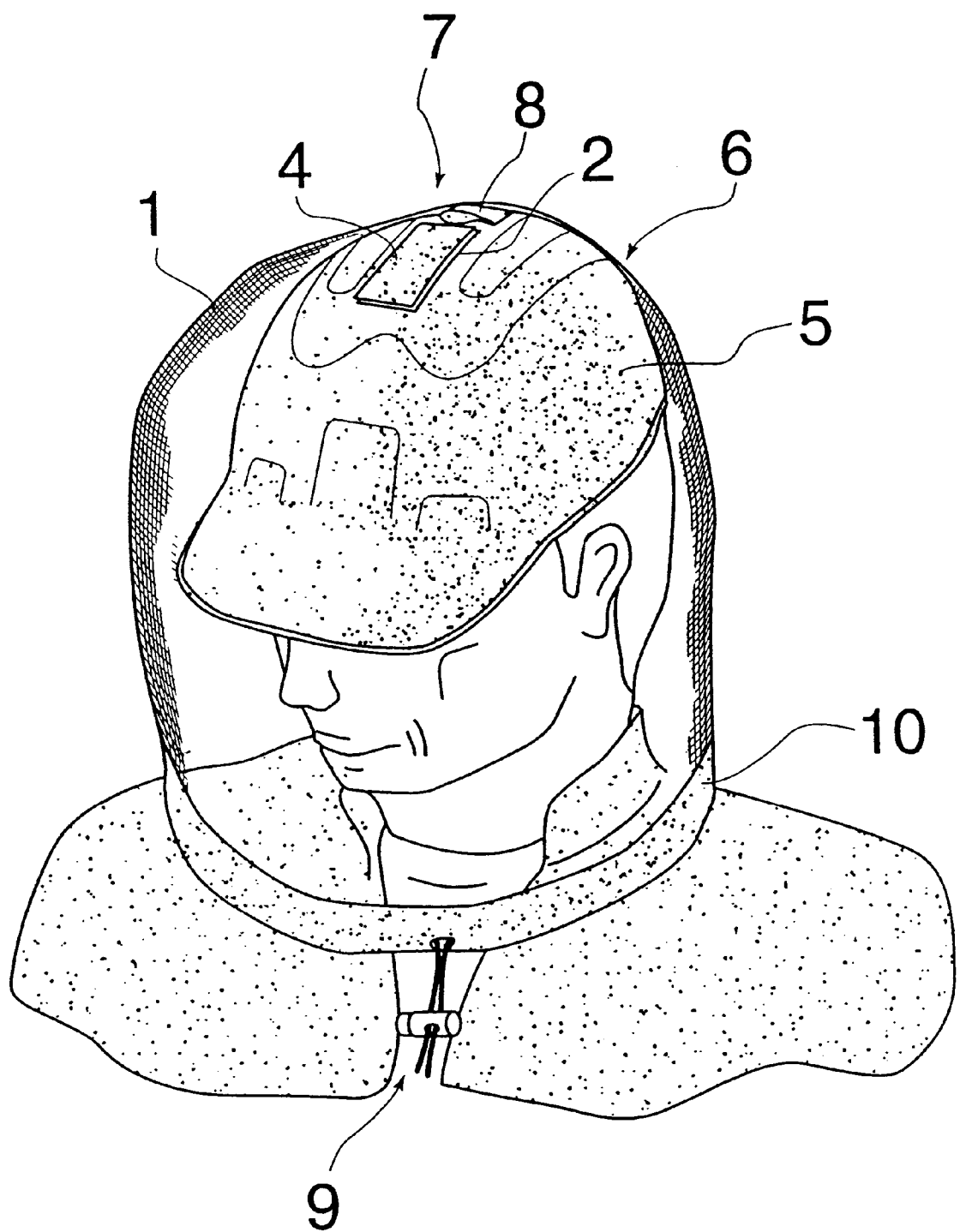
FIG. 1 is a perspective view of the invention in which the head screen fits over a construction style hard hat with a strip of a hoop and loop fastener attached to the top inside of the head screen and attaching to another complementary strip of hook and loop fastener attached to a top of the hard hat.
Figure 2:
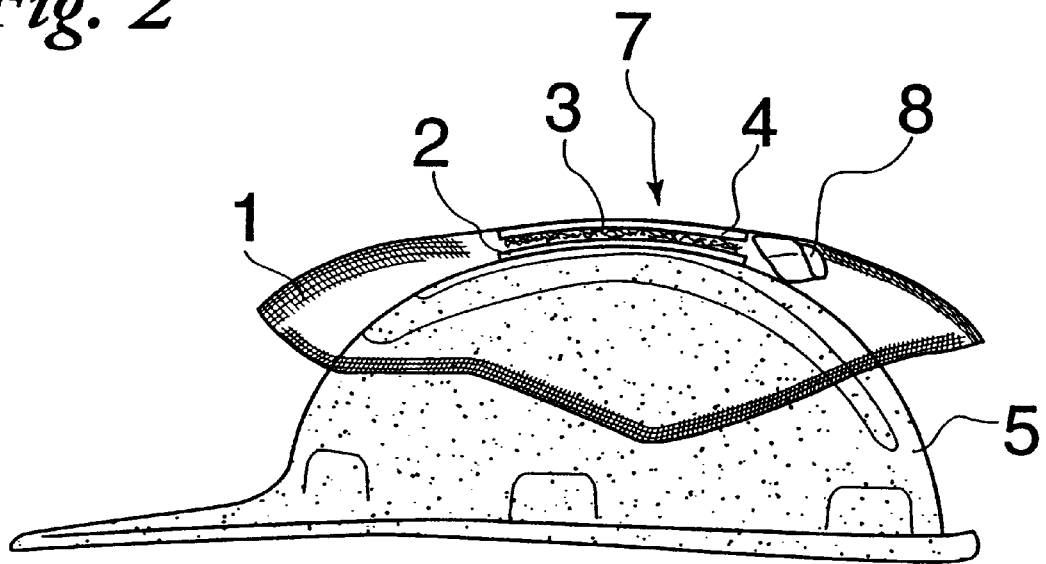
FIG. 2 is a side view showing the attachment of the head screen to the top of the hat with hook and loop fastener.
Figure 3:
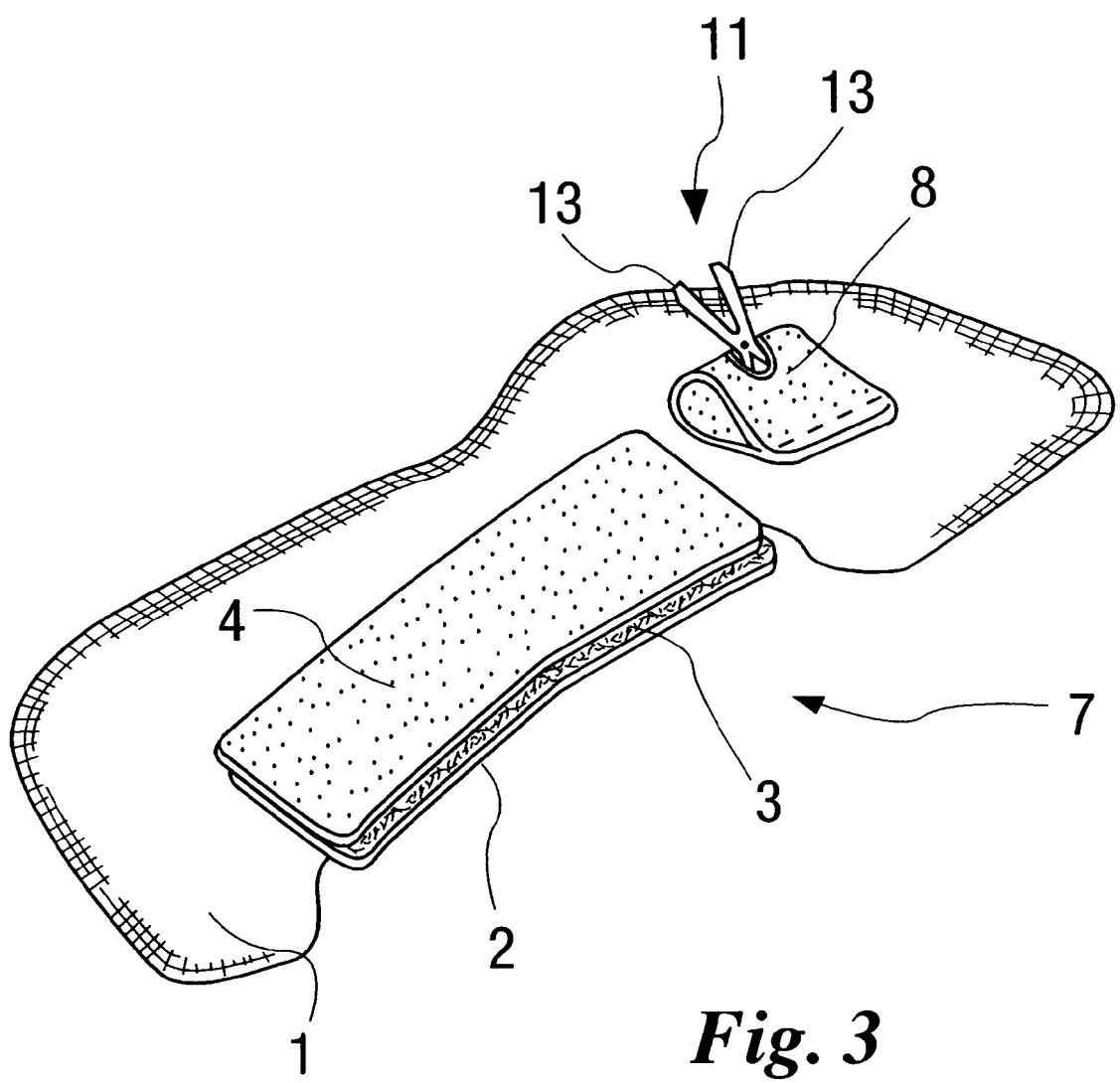
FIG. 3 is an enlarged view of the hook and loop fastener and a separate strip defining the button hole with a clip/clamp.
Figure 4:
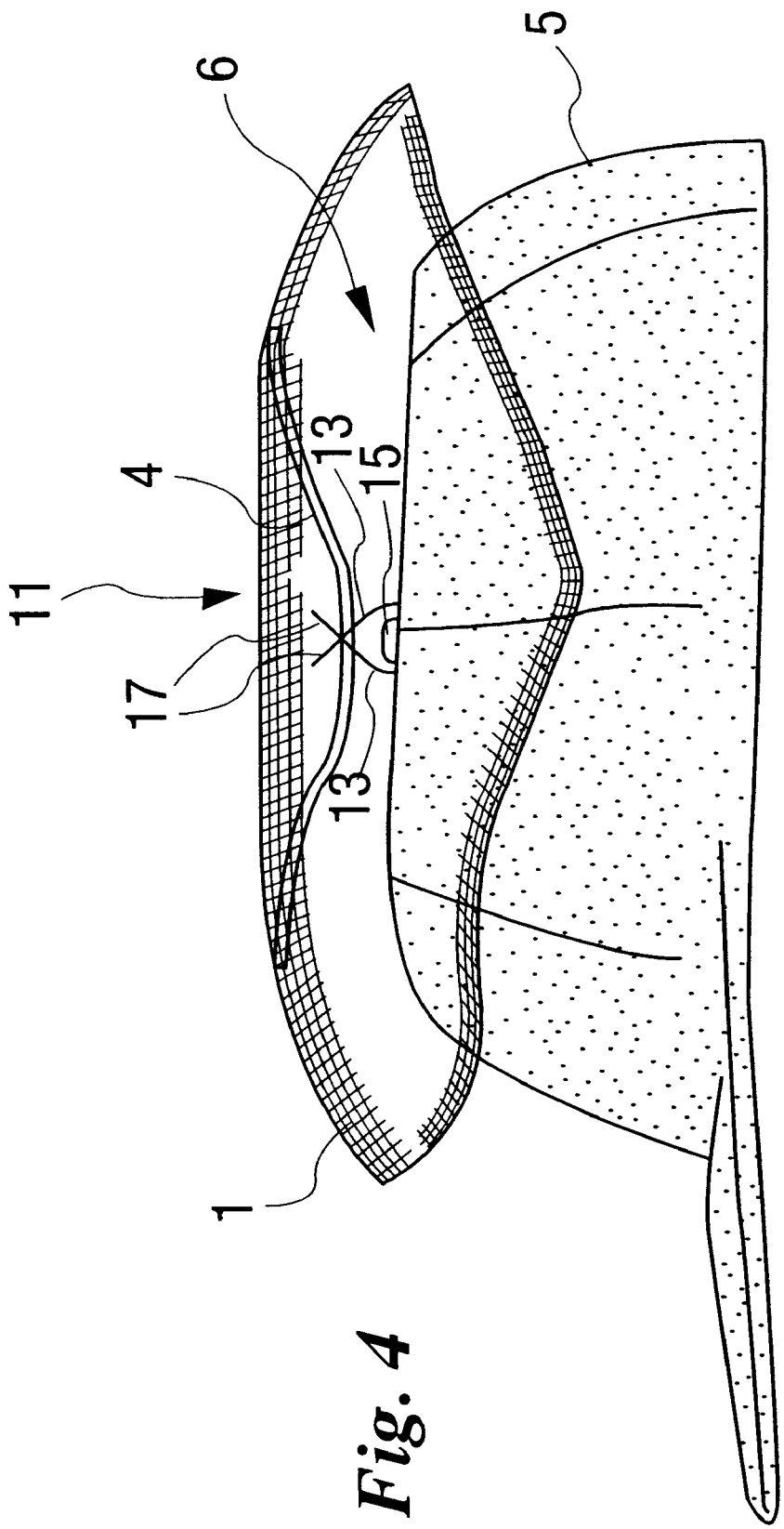
FIG. 4 is a side view showing the attachment of the head screen to the top of the hat with a clip/clamp fastener.

Referring to the drawings, especially FIG. 1, the present invention is a head screen constructed of a mesh fiberglass screen material 1 similar to that used in window screens found in most homes. The shape is substantially cylindrical, which includes other shapes used depending on the application or situation to be encountered by the user and/or a particular style of hat or helmet. One end of the cylindrical shape is open and the other end is closed. The cylindrical shape can be formed from a sheet of screen material by forming seams at a top and back of the head screen.

An attachment element is positioned at the closed end of the screen material for attaching to a head of the user. The attachment element preferably includes a hat 5 and a fastening element 7 for fastening the closed end of the cylindrical shape to a top of the hat 5. The hat 5 can be any type of hat. In the preferred embodiment, the hat 5 is a hat with a brim or bill extending at least over and away from the eyes of the user. Baseball style hats as well as construction style hard hats, and helmets such as bicycling and horseback riding helmets are preferred. Hats with a brim extending from the other parts of the head are also possible, such as sombrero and cowboy style hats. The bill or brim is beneficial in keeping the screen material 1 away from the eyes of the wearer, and the hat itself gives a secure attachment to the head.

The hat 5 is positioned inside the cylindrical shape and fastened to the closed end of the screen material 1. A preferred embodiment of the present invention is where the attachment element 6 just includes the fastening element 7. In this embodiment, the hat or helmet 5 is provided separately by the user.

The fastening element 7 can be any structure which can fasten the screen material 1 to the hat 5. One preferred embodiment of the fastening element 7 includes two complementary strips 2, 4 of hook and loop fasteners commonly known by the trademark Velcro. One strip 4 is connected to the inside top, or closed end, of the screen material 1, by sewing, adhesive, or other means. The other strip 2 is connected to the hat or helmet 5 by sewing, adhesive or even incorporated in the very nature of the hat. A hat with a naturally fuzzy outer surface could form the loop strip of the hook and eye fastener.

The fastening element 7 in another embodiment is a button hole means 8 for fastening the closed end of the cylindrical shape to a button on a baseball style hat. The button is positioned in a substantially center top portion of the hat which allows the cylindrical shape to be substantially symmetrical for most applications.

The button hole means includes a strip 8 attached to the inside top, or closed end, of the screen material 1. The strip 8 is preferably elastic and defines a button hole or slit. The strip could both be one part of the hook and eye fastener, and also define an elastic button hole.

Another embodiment of the fastening element 7 is a clamp 11 which clamps onto the hat or helmet 5. The clamp includes jaws 13 for clamping onto a button 15 of the hat 5, or onto any portion of the hat 5. The jaws 13 are spring biased into a closed position to hold firmly onto the hat 5. The clamp 11 preferably holds the jaws 13 pivotally movable, but axially and laterally movable jaws 13 are also possible. The clamp 11 includes handles 17 for moving the jaws 13. The handles 17 are insertable into the buttonhole in the strip 8 for holding the clamp 11 to the strip 8 and the screen material 1. In a variation of the clamp arrangement, the jaws 13 of the clamp 1 1 can clamp onto both the hat 5 and the screen material 1.

All other fastening elements that allow a closed end of a cylindrical screen 1 to be fastened to the top of a hat are within the scope of this invention.

A collar 10 can be arranged at the open end of the screen material 1 for fastening the open end of the screen material 1 to a collar of a shirt of the user. The collar means 10 includes a draw string tightenable around the collar of the shirt of the user. The collar 10 of the screen material 1 can be formed by the screen material of the open end folded back on itself to define a string passage for a string 9. It is also possible for a piece of cloth, more sturdy than the screen material 1, to be connected to the open end 10, and define the string passage. This allows the screen material to be very light and still allows the collar 8 to be securely attached to the user.

The features described in the specification, drawings, abstract, and claims, can be used individually and in combinations for practicing the present invention. While specific embodiments of the invention have been shown and described in detail to illustrate the application of the principles of the invention, it will be understood that the invention may be embodied otherwise without departing from such principles. Other embodiments being as an example, different hat styles and different types of fastening element connecting to a closed end of cylindrically shaped screen material.

What is claimed is:

1. An insect protective head screen comprising:
   screen material formed into a substantially cylindrical shape with an open end and a closed end;
   an attachment element arranged at said closed end of said screen material and attaching to a head of a user, said attachment element includes a fastening means for fastening to a portion of a hat when said screen material surrounds the hat, said fastening means is repetitively attachable and detachable to the hat without substantially damaging either said attachment element or the hat.

2. A head screen in accordance with claim 1, wherein:
   said attachment element includes one part of a hook and loop fastener for attaching to another part of said hook and loop fastener arranged on the head of the user.

3. A head screen in accordance with claim 1, wherein:
   said attachment element includes a hook part of a hook and loop fastener for attaching to a loop part of said hook and loop fastener arranged on the head of the user.

4. A head screen in accordance with claim 1, wherein:
   said attachment element includes a strip connected to a substantially center portion of said closed end of said screen material, said strip forming one part of a two part hook and eye fastener.

5. A head screen in accordance with claim 1, wherein:
   said attachment element includes a strip connected to a substantially center portion of said closed end of said screen material, said strip defining a buttonhole for connection to a button and forming one part of a two part hook and eye fastener.

6. A head screen in accordance with claim 1, wherein:
   said attachment element includes a clamp clamping onto the hat of the user.

7. A head screen in accordance with claim 6, wherein:
   said clamp clamps onto a button on a top portion of the hat.

8. A head screen in accordance with claim 6, wherein:
   said attachment element includes a strip fastened to said screen material and defining a buttonhole;
   said clamp includes handles insertable into said buttonhole and said clamp is attachable to said strip through said handles inserted into said buttonhole.

9. A head screen in accordance with claim 7, wherein:

said attachment element includes a strip fastened to said screen material and defining a buttonhole;

said clamp includes handles insertable into said buttonhole and said clamp is attachable to said strip through said handles inserted into said buttonhole.

10. A head screen in accordance with claim 8, wherein:

said strip includes an elastic material defining said buttonhole.

11. A head screen in accordance with claim 1, wherein:

said attachment element includes one of a hat and helmet wearable by the user and a fastening element for fastening to a substantially center top portion of said hat.

12. A head screen in accordance with claim 11, wherein:

said fastening element includes two strips of hook and eye fasteners, one of said strips being connected to said closed end of said screen material, and another of said strips being connected to said substantially center top portion of said one of said hat and helmet.

13. A head screen in accordance with claim 12, wherein:

said two strips are connected to said screen material and said hat by one of sewing and adhesive.

14. A head screen in accordance with claim 11, wherein:

said one hat and helmet is one of a baseball style hat, a construction type hard hat, horseback riding helmet and bicycle helmet.

15. A head screen in accordance with claim 11, wherein:

said one of said hat and helmet is positioned inside said cylinder shape and adjacent said closed end of said screen material.

16. A head screen in accordance with claim 11, wherein:

said one of said hat and helmet has a bill which extends over eyes of the user and holds said screen material away from a face of the user.

17. A head screen in accordance with claim 1, further comprising:

collar means arranged at said open end of said screen material and for fastening said open end of said screen material to a collar of a shirt of the user.

18. A head screen in accordance with claim 17, wherein:

said collar means includes a strip of material stronger than said screen material connected to said open end of said screen material and defining a draw string passage, said collar means also includes a draw string positioned in said draw string passage and tightenable around the collar of the shirt of the user.

19. A head screen in accordance with claim 1, wherein:

said fastening means fastens to said portion of the hat when said screen material surrounds the hat and the head of the user.

20. A head screen in accordance with claim 1, wherein:

said fastening means fastens to a substantially center top portion of the hat.

* * * * *